Figure 1:
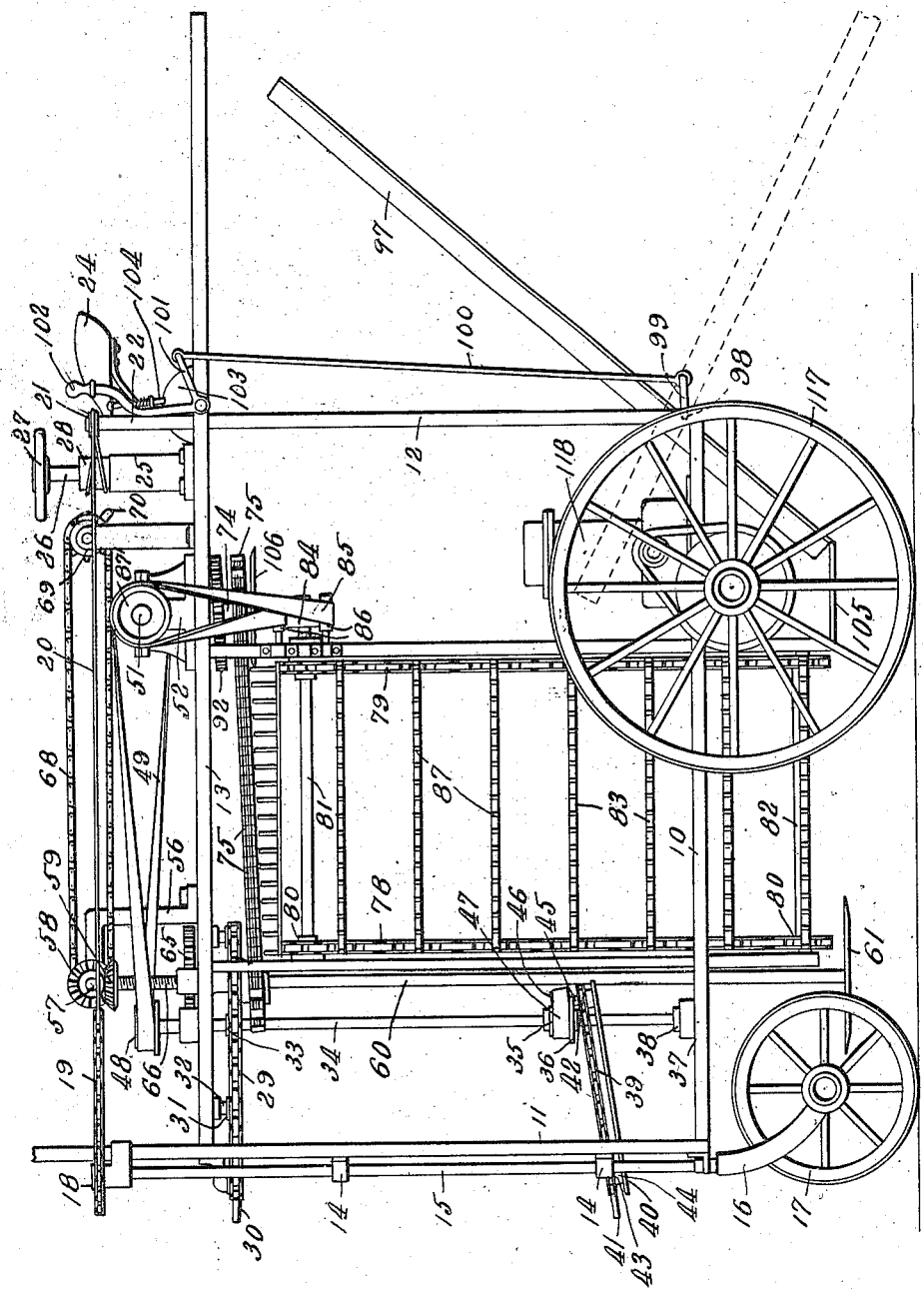

C. E. BELL.
CANE CUTTING MACHINE.
APPLICATION FILED AUG. 19, 1912. RENEWED JUNE 7, 1915.

1,168,467.

Patented Jan. 18, 1916.
6 SHEETS—SHEET 1.

Witnesses
H. G. Robinette
J. J. Mawhinney

Inventor
Charles E. Bell
By Cayner Cushman Rea
Attorney

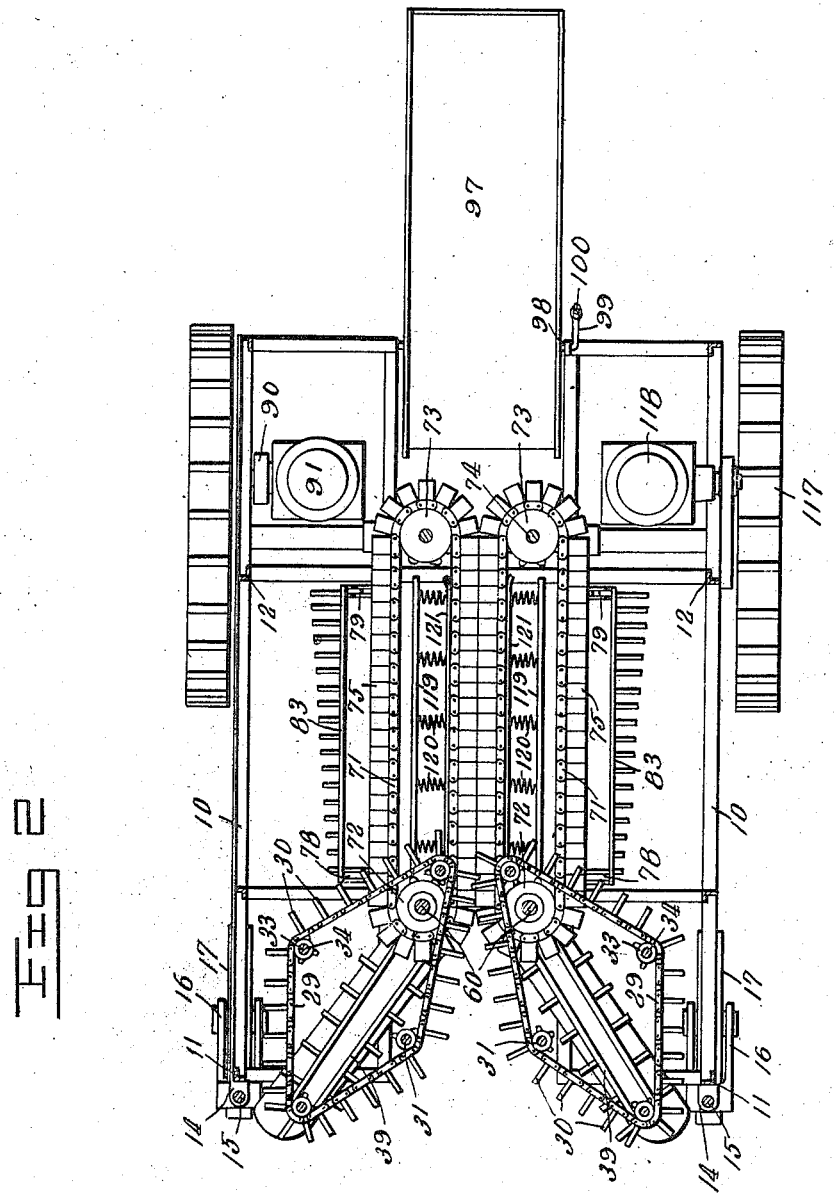

C. E. BELL.
CANE CUTTING MACHINE.
APPLICATION FILED AUG. 19, 1912. RENEWED JUNE 7, 1915.
1,168,467.
Patented Jan. 18, 1916.
6 SHEETS—SHEET 3.
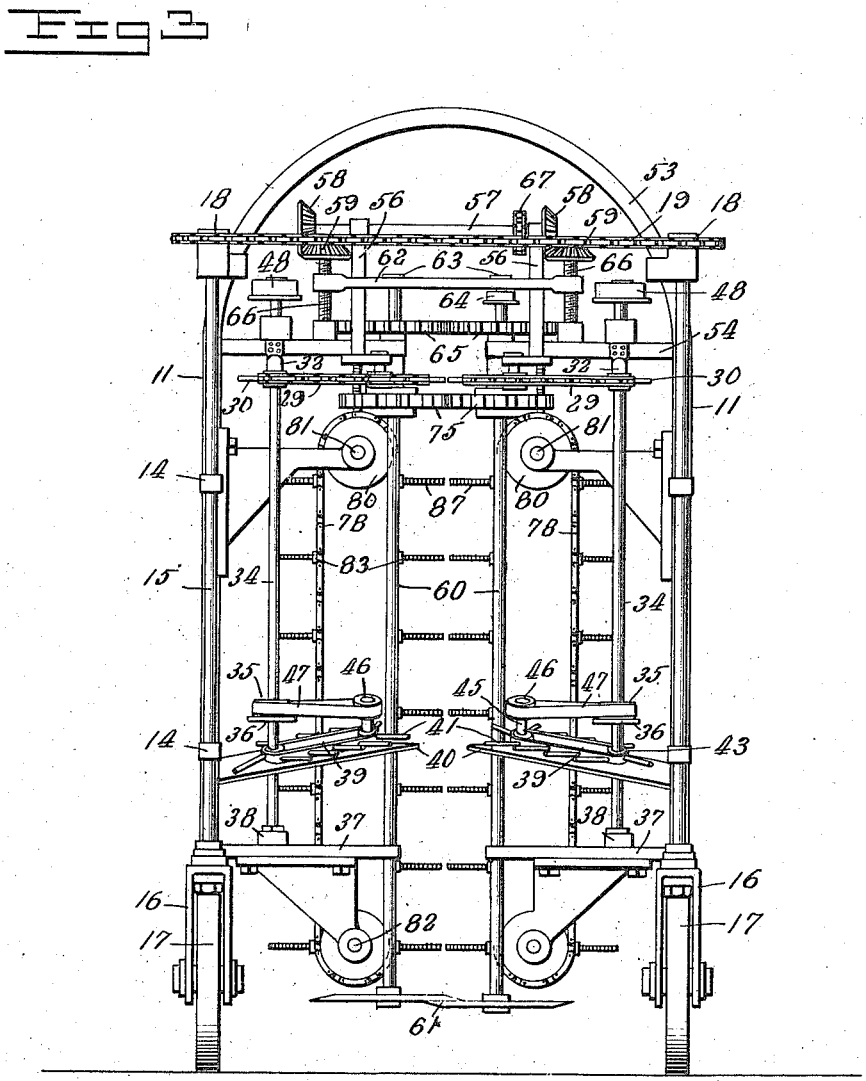
Witnesses
H. C. Robinette
J. D. Mawhinney
Inventor
Charles E. Bell
By [signature]
Attorney

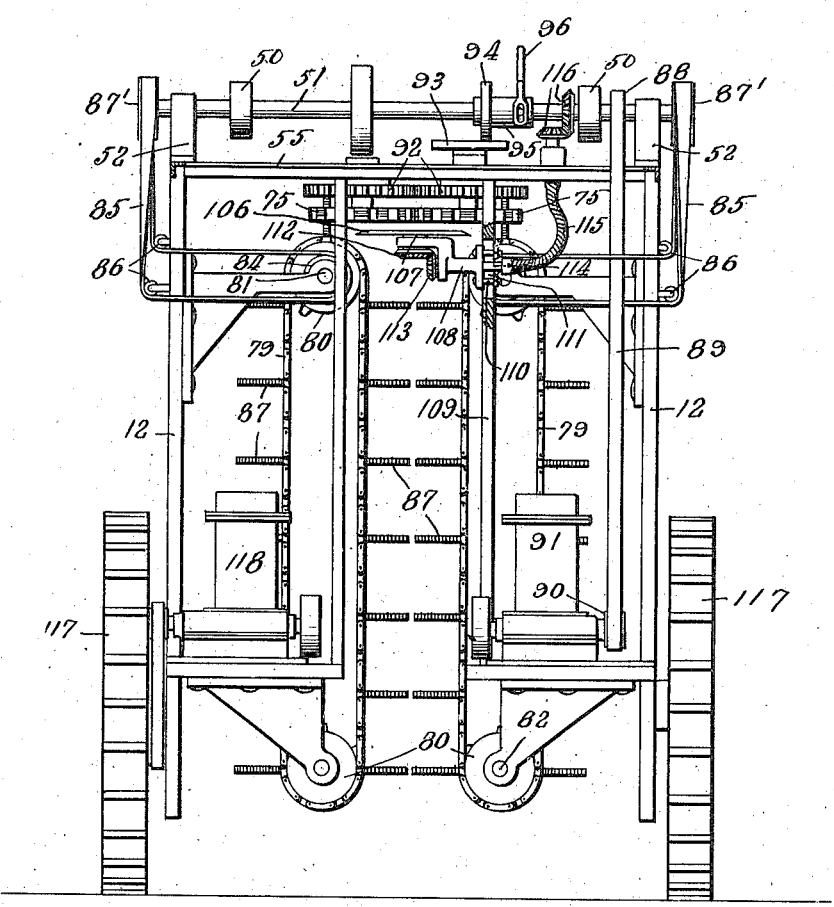

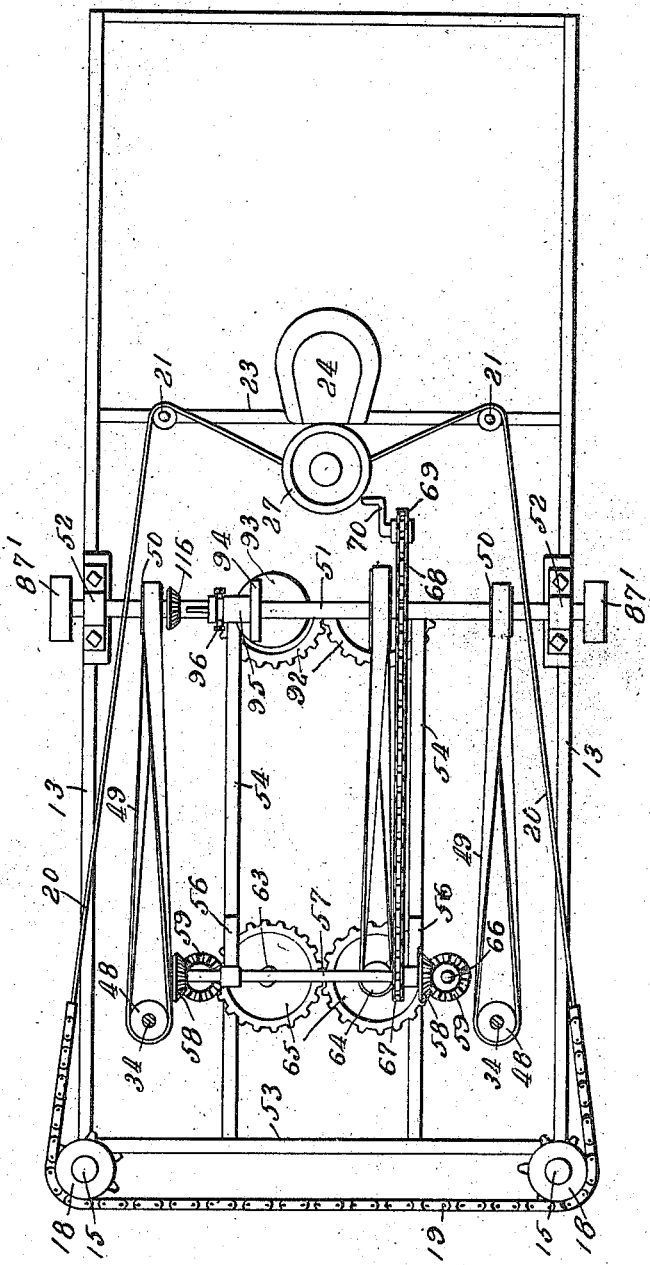

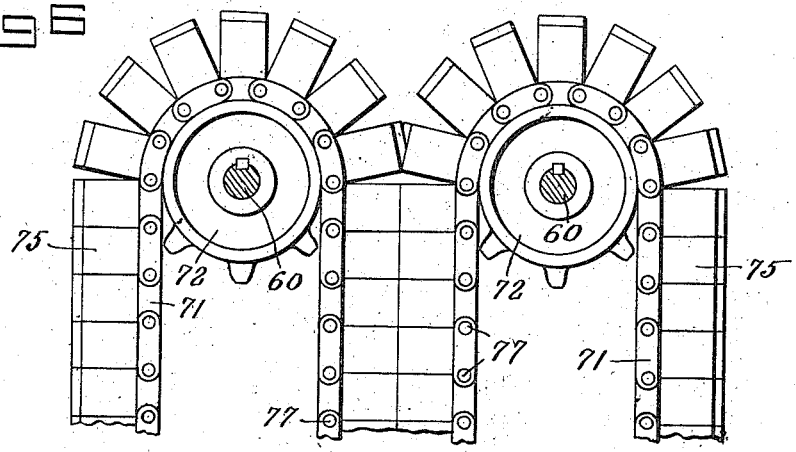
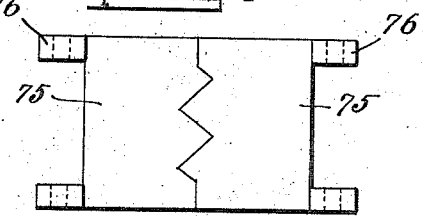
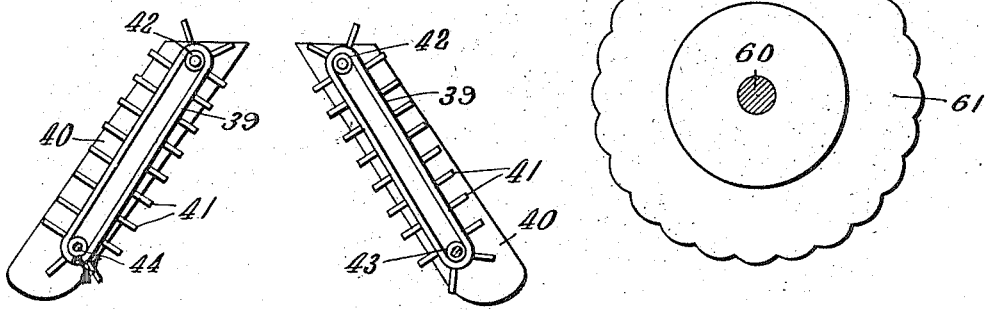

UNITED STATES PATENT OFFICE.

CHARLES E. BELL, OF WEEKS, LOUISIANA.

CANE-CUTTING MACHINE.

1,168,467. Specification of Letters Patent. Patented Jan. 18, 1916.

Application filed August 19, 1912, Serial No. 715,803. Renewed June 7, 1915. Serial No. 32,731.

*To all whom it may concern:*

Be it known that I, CHARLES E. BELL, a citizen of the United States, residing at Weeks, in the parish of Iberia and State of Louisiana, have invented new and useful Improvements in Cane-Cutting Machines, of which the following is a specification.

This invention relates to an improved stalk-cutting and stripping machine, adapted particularly to cut and strip cane sorghum, Kafir corn, milo maize, and like plants, the improved machine being adjustable to accommodate the same to the varying heights of such plants.

The object of this invention is to provide a machine of this character with adjustable cutters adapted to sever the stalks of the plants at various heights from the ground; the cutters being also adapted for adjustment relative to their speed of rotation independently of the speed of travel of the machine.

The invention has for another object to provide a cane cutter and stripper of this character with feeders or gatherers adapted to contact with the stalks and straighten the same and to guide the stalks into the throat of the machine, the feeders delivering the stalks to the stripping mechanism and into a conveyer or gripper to hold the stalks in position during the operation of the stripping mechanism upon the same.

A further object of this invention is to provide a novel form of gripper or conveyer comprising coöperating endless belts or chains carrying blocks which have corrugated faces adapted to be brought into intermeshing engagement, and seize or bind therebetween the tops of the stalks and carry them centrally and longitudinally from the front to the rear end of the machine. These grippers hold the stalks from downward movement under the action of the strippers, the corrugations in the blocks being preferably horizontal to provide an increased gripping surface area for the blocks.

The invention set forth designs to provide a complete machine with an improved power transmission mechanism, whereby the several parts, such as the cutters, the feeders and grippers, and the strippers, may be driven at independent speeds to effect the complete control of the machine; all of these adjustments of speed being independent of the speed of travel of the machine.

Broadly, the invention consists in a traveling frame having feeders or guides for engagement with the stalks to bend the same into upright position and direct them straight into the throat of the machine; adjustable cutters at the lower portion of the frame to sever the stalks from the ground; having traveling gripping blocks adapted to grasp the tops of the stalks simultaneously with the cutting action of the cutters, the gripping blocks carrying the stalks centrally from the front to the rear of the machine; having strippers below the gripping blocks and at the sides thereof to engage the stalks and remove the leaves therefrom as the stalks are moved through the frame by these gripping blocks; and having the adjustable cutter at the rear upper end of the frame beneath the conveyer to sever the tops from the stalks after the same have been stripped, all of the above mechanisms being independently operated to admit of the independent adjustment of the speeds of each one of the same.

This improved machine is adapted, first, to cut the stalk from the ground and simultaneously grasp the top of the stalk to suspend the same after being cut; second, to carry the stalk in suspended position through the machine, and to strip the stalk while being thus conveyed, and third, to sever the top from the stalk after the stripping action and after the top has served the purpose of supporting the stalk during the action of the lower cutters and the strippers.

Other objects of this invention will hereinafter appear and be brought out in the peculiar construction, arrangement, and in the combinations of parts set forth in the following detailed description, accompanying drawings, and in the appended claims.

In the drawings, disclosing one embodiment of this invention, Figure 1 is a side elevation of the improved cane-cutting machine; Fig. 2 is a horizontal section, on the line 2—2 of Fig. 1; Fig. 3 is a front elevation of the machine; Fig. 4 is a rear elevation, parts of the machine being broken away; Fig. 5 is a top plan view of the driving mechanism for the several operating parts of the machine; Fig. 6 is an enlarged detail, showing a top plan view of one end of the gripper or conveyer; Fig. 7 is an enlarged detail view of a part of the intermeshing gripping blocks; Fig. 8 is a top plan view of one of the feeders or guides carried forwardly of the throat or at the entrance of the machine; Fig. 9 is a detail enlarged plan view of one of the stalk-cutters operating beneath the throat of the machine.

Referring specifically to the drawings, in which like parts are designated throughout the several views by similar reference numerals, the main frame of the machine comprises the lower side bars 10, provided at their opposite ends with the forward and rear uprights 11 and 12, respectively, held in vertical, parallel relation by the upper side bars 13. The forward uprights 11 are provided with a number of bearings 14, spaced upon the uprights and being disposed in vertical registration for rotatively supporting guiding shafts 15 at the forward edges of the uprights 11. Forks 16 are carried upon the lower extremities of the guiding shafts 15, are preferably curved backwardly beneath the frame and support suitable caster wheels 17. Sprockets 18 are carried upon the upper ends of the guiding shafts 15 above the frame, and are connected for simultaneous operation by a chain 19 lapping over the forward sides of the sprockets 18 and having its extremities extending rearwardly at the sides of the frame. A guiding cable 20 is attached at its free ends to the extremities of the chain 19, the ends of the cable 20 passing rearwardly and engaging over idlers 21 mounted upon posts 22 rising from a cross brace 23 connecting the upper side bars 13 at the rear of the frame. It will be observed from Fig. 5 that the idlers 21 are arranged adjacent to the sides of the frame. The cross brace 23 suitably carries a seat 24 for the operator, and forwardly of the seat 24 is disposed a steering post 25 provided with an upwardly extending rotating stem 26 adapted to be turned by a hand-wheel 27. The stem 26 is provided with a drum-portion 28 receiving in coiled relation thereto, the intermediate portion of the guiding cable 20. It is thus observed that when the hand wheel 27 is turned the stem 26 and drum portion 28 are moved therewith and cause the guiding cable 20 to travel over the drum and move the connecting chain 19 over the sprockets 18. The sprockets 18 are thus revolved to effect the turning of the guiding shafts 15 simultaneously, thereby turning the caster wheels 17 to the desired angle and effecting the movement of the frame in the corresponding direction.

The main frame of the machine is provided with upper and lower feeders or guides adapted for engagement with the stalks to direct the same in a vertical position into the throat of the machine. The upper guide or feeder comprises a pair of endless chains 29 provided with pluralities of spaced and outwardly extending fingers 30 adapted to intermesh when brought into close position. The chains 29 are supported upon a number of idlers 31, mounted upon stub shafts 32 depending from the upper with their inner runs close together and their zontal plane directly beneath the plane of the side bars 13. From Fig. 2 it will be observed that the chains 29 are arranged with their inner runs close together and their outer runs spaced widely apart, and the idlers 31 at the inner sides of the chains are displaced inwardly from the lines of divergence of the chains providing a widely-flaring throat between the chains, the throat having a contracted portion which converges toward the inner runs of the chains where the fingers 30 of the opposite chains 29 intermesh. The fingers 30 of this upper feeder or guide are adapted to grasp the tops of the stalks and gather the same into the contracted portion of the throat of the machine. Sprockets 33, fixed upon vertical shafts 34, engage the outer sides of the chains 29 and hold each chain in the configuration of a diamond, as may be seen in Fig. 2. The shafts 34 extend down within the frame and carry pulleys 35 provided with belt-supporting flanges 36 at their lower edges. The lower side bars 10 are provided with oppositely disposed and inwardly-extending platforms 37 running longitudinally of the frame and being spaced apart at the central portion of the frame to provide a longitudinal passage therethrough. The platforms 37 carry bearings 38 for the reception of the lower ends of the vertical shafts 34, the bearings 38 being preferably of the thrust-type to support the shafts 34 in position.

The lower gripper or feeder comprises a pair of endless belts or chains 39 operating over a pair of guide plates 40 converging rearwardly from the forward corners of the frame directly beneath the upper guide or feeder. A plan view of these belts and guiding plates is disclosed in Fig. 8, showing the relative position of the belts to the plates. Each belt or chain 39 is provided with a plurality of outstanding and spaced apart fingers 41 projecting into the throat of the machine and adapted to engage against the sides of the stalks and carry the same rearwardly and centrally into the machine. It will be noted that the chains 39 are arranged diagonally over the plates 40 so as to project the fingers 41 into the throat to a greater extent beyond the edges of the plates 40 at the forward ends of the latter. As each of the fingers 41 moves rearwardly over the plate 40, it gradually recedes from the edge and finally frees the stalk at the inner rim of the chain supporting the finger. The chains 39 pass over sprockets 42 and 43, disposed respectively above the inner and the outer ends of the guide plates 40, the outer sprockets 43 being arranged upon stub shafts 44 rising from the plates 40. The rear sprockets 42 are fixed upon upwardly extending shafts 45 carried upon the plates 40, the shafts 45 having pulleys 46 upon their upper ends spaced slightly above the chains 39 to support driving belts 47 extending laterally and outwardly from the feeder and passing over the pulleys 35 on the shafts 34. Upon the upper ends of the shafts 34 are disposed drive pulleys 48 receiving the forward ends of belts 49 extending from pulleys 50 located in spaced relation upon a transverse main power shaft 51. The power shaft 51 is mounted in suitable bearings 52 disposed upon the upper side bars 13 towards the rear end of the machine.

The forward cross-brace 53 is disposed upon the top of the frame and supports the forward ends of intermediate bars 54 extending back in parallelism to a cross-brace 55 arranged immediately beneath the main operating shaft 51. The intermediate bars 54 are provided with upstanding and forwardly curved brackets 56 having journaled in their forward ends a transverse shaft 57 provided upon its extremities with beveled pinions 58. The beveled pinions 58 have their toothed faces extending in one direction, as for instance, to the left, as is disclosed in the drawings, and intermeshing with horizontally disposed and correspondingly beveled pinions 59. Cutter shafts 60 are journaled in the frame inwardly of and beneath the brackets 56. The cutter shafts 60 are provided upon their lower extremities with overlapping and coöperating cutter disks 61, the meeting point of which is disposed immediately beneath the inner ends of the throats of the feeders. The upper ends of the cutter shafts 60 are journaled through a cross-head 62, the shafts 60 being headed, as at 63, to support the same upon the cross-head and to move the shafts vertically with the cross-head. A pulley 64 is mounted upon one of the shafts 60, while intermeshing gears 65 are carried upon the shafts 60, beneath the pulley 64 to communicate motion to the opposite vertical shaft.

The cross-head 62 is adapted for vertical adjustment within the frame and for the purpose of effecting such adjustment a pair of jack screws 66, carrying the beveled gears 59 upon their upper ends, are mounted upon the intermediate bars 54 and engage in threaded relation through the opposite ends of the cross-head 62. The transverse shaft 57 is provided adjacent one end with a sprocket 67, over which passes a chain 68 engaging at its rear end over a second sprocket 69 carried upon a crank handle 70 adapted for moving the chain 68 and rotating the shaft 57. The crank arm 70 is mounted upon the frame at a point adjacent to the hand wheel 27 for engagement by the hand of the operator in order to adjust the cross-head 62 within the frame to raise and lower the cutting disks 61.

The improved machine is provided with a gripping mechanism or conveyer adapted to grasp the tops of the stalks as they enter the throat of the machine and carry the stalks in hanging position longitudinally to the rear end of the frame. This gripping or conveying mechanism comprises a pair of endless chains 71 mounted at their forward ends, as shown in Fig. 6, upon sprocket wheels 72 carried loosely about the shafts 60 for rotation independently thereof and to admit of the longitudinal sliding movement of the shafts 60 therethrough.

The rear ends of the chains 71 pass over toothed sprockets 73 mounted upon vertical shafts 74 in the rear end of the frame. A plate 119 is vertically disposed between the sides of each of the chains 71 and is supported by the frame of the machine. These plates 119 extend longitudinally between the runs of the chains and carry upon their inner sides rows of springs 120, across the outer ends of which are secured tension plates 121. The tension plates 121 are held against the inner sides of the chains 71 to yieldingly hold the gripping blocks 75 carried upon the outer faces of the chains together as they travel from end to end in the upper portion of the throat of the machine. It will be observed that the tension plates 121 are curved inwardly at their ends to present rounded edges to admit of the easy sliding of the endless conveyers or chains 71 thereover, when placed under tension by the top of the stalk tending to space apart the gripping blocks. The chains 71 are disposed in parallelism, and have their inner sides disposed in proximity to one another for bringing into intermeshing contact series of the gripping blocks 75 secured to the links of the chains 71. With reference to Fig. 7, it will be noted that each of the blocks 75 is provided at its upper and lower edges and at its inner end with apertured lugs 76, for the reception of the rivets 77, connecting the links of the chains 71. Each of the blocks 75 is provided with a serrated face forming a number of teeth adapted to intermesh with the opposite block 75 upon the opposite chain 71, such opposite block having complemental serrations adapted to fit tightly against the serrated face of the first block. The serrations in the faces of the blocks are preferably formed horizontally so as to produce an increased gripping surface area for the blocks for supporting the tops of the stalks.

From Fig. 1, it will be noted that the gripping or conveying mechanism is placed at a slight inclination in the frame, the rear end thereof being slightly raised from the plane of the forward end. It will be also noted that by this construction the blocks 75 intermesh at points immediately above the contacting points of the cutters 61, so as to grasp the tops of the stalks simultaneously with the cutting of the lower ends of the same.

In Fig. 9 is disclosed the preferred form of cutting disk 61, provided with a serrated edge, presenting an indefinite number of angular cutting edges to the sides of the stalks so as to effect, to some extent, a chopping action against the stalks.

The machine is provided with a stripping mechanism adapted to tear the leaves from the stalks as they are conveyed from the forward to the rear end of the machine. This stripping mechanism is in the form of forward and rear pairs of chains 78 and 79, arranged in parallel and vertical position and being supported at their ends upon sprockets 80 carried on horizontal shafts 81, 82, disposed longitudinally in the frame. The chains 78 and 79 carry stripper bars 83 longitudinally disposed in the frame and supported at their opposite ends and in spaced relation upon the chains 78 and 79, the same being adapted for vertical movement within the frame. The shafts 81 are provided upon their rear extremities with driving pulleys 84, receiving thereover the inner ends of driving belts 85, which are carried inwardly through the opposite sides of the frame over idlers 86 from the driving pulleys 87' carried upon extended extremities of the main driving shaft 51. The stripper bars 83 are each provided with outwardly extending prongs or fingers 87 consecutively increasing in length from the forward to the rear ends of the stripper bars. These stripper fingers 87 are spaced apart at their ends at the central portion of the machine so as to admit of the passage of the stalks between the same, and to strike the leaves of the stalks to remove the same therefrom. The shafts 81 are given movement in a direction to carry the stripper fingers 87 downwardly through the central portion of the frame so as to move down against the sides of the stalks during the action of the grippers or conveyers carrying the stalks longitudinally through the frame.

From Fig. 4 it will be particularly noted that the main driving shaft 51 is provided with a pulley 88 adjacent one end thereof and inwardly of the bearing 52, over which passes the main driving belt 89 depending through the frame of the machine and engaging over a pulley 90 carried upon a suitable driving motor 91. The motor 91 is adapted to rotate the main driving shaft 51, the latter having independent connection with the several mechanisms hereinbefore set forth, so as to drive the same at different speeds.

The means employed for imparting movement to the gripping mechanism or conveyers comprises a pair of intermeshing gears 92 fixed upon the stub shafts 74 supporting the toothed wheels 73, one of the shafts 74 extending up through the cross-brace 55 beneath the shaft 51 carrying a friction disk 93 bearing against an adjustable friction pulley 94 carried upon the sliding sleeve 95 arranged for longitudinal movement upon the shaft 51 at its middle portion. A hand lever 96 is connected with the sleeve 95 for the purpose of sliding the pinion 94 over the upper face of the friction disk 93 to vary the speed of rotation of the shaft 74 with respect to the main driving shaft 51.

In the rear end of the frame is disposed a tilting table 97, the same being hinged between the rear ends of the lower side bars 10 at a point adjacent to the forward end of the table 97, the pivotal supporting point 98 of the table 97 being fixed thereto and having an outstanding crank arm 99, which is pivotally connected to the lower end of a connecting rod 100, which is hinged at its upper end upon the horizontal arm of a bell crank lever 101, the opposite arm of which extends upwardly and merges into a handle 102 disposed adjacent to the seat 24 of the operator. The upper side bar 13 carries a notched segment 103 receiving a latch 104 carried upon the handle 102 for the purpose of locking the handle in upright position to hold the table 97 in upright position for the reception of the stalks as they pass from the stripper and conveyer. An apron 105 is carried upon the forward end of the tilting table 97 and is adapted to receive the butts of the stalks as they pass from the stripping mechanism.

After the stalks have passed from the stripping mechanism and immediately prior to the delivery of the same from the conveyers onto the tilting table 97, the tops of the stalks are severed therefrom by the top cutting disk 106. The disk 106 is mounted upon the upper end of a pin 107 journaled through the horizontal arm of a bracket 108 vertically adjustable upon the upright 109 disposed within the frame and extending upwardly from the rear end of the bracket 37 to the cross bar 55. The bracket 108 is adjustably connected to the frame in any suitable manner, as by the provision of the clamping bolts 110, engaging in the vertical slot 111 disposed in the upright 109. The lower end of the pin 107 carries a beveled gear 112 intermeshing with a beveled pinion 113 carried upon the end of the operating shaft 114, disposed in the bracket 108, the shaft 114 being suitably connected by a flexible shaft 115 and the gears 116, to the main driving shaft 51. It is thus seen that the top cutting disk 106 may be adjusted, and at the same time is adapted for constant rotation to sever the tops from the stalks as they are carried back between the gripping blocks. As the stalks pass from the strippers and the gripping blocks, the same fall upon the apron 105 and fall backwardly upon the tilting table 97. The tops of the stalks fall down upon the apron 105 after the stalks have been severed and have fallen toward the tilting table 97. The main frame of the machine is suitably mounted upon traction wheels 117 mounted adjacent to the rear end of the frame and driven in any suitable manner as by a motor 118.

The operation of the improved cane-cutting and stripping machine is as follows: The machine is driven forwardly by the motor 118 and is guided in the desired direction by the caster wheels 17 through the steering mechanism hereinbefore described and operated by the hand wheel 27. As the machine moves against a stalk the upper gatherer or guide 29 strikes the sides of the stalk and the fingers 30 engage against the outer side of the stalk and move the same into the throat of the machine. The lower guide or gatherer 39 engages the butt of the stalk and moves the same into the throat of the machine simultaneously with the upper end of the stalk. The gatherers move the upper and lower ends of the stalk simultaneously against the cutting disks 61 and the gripping blocks 75. The gripping blocks 75 bind against the opposite sides of the tops of the stalks to support the same as the cutting disks 61 simultaneously sever the lower ends of the stalks from the ground. The operator now manipulates the handle 96 to adjust the friction disks 93 and 94 to set the grippers or conveyers at the desired speed to carry the stalks rearwardly and up through the frame. As the stalk is carried rearwardly and centrally through the frame by these grippers, the stripper mechanism operates against the opposite sides of the stalks, bringing the stripping fingers 87 against the leaves of the stalks and tearing the same therefrom, carrying the leaves down and out from the bottom of the frame. The stalks are carried from the strippers and engage at their upper ends against the top cutting disk 106, severing the top from the stalk and admitting of the falling of the stalk upon the apron 105. The movement of the machine imparts a rearward tilting movement to the stalk which falls upon the tilting table 97. Subsequent to the falling of the stalk upon the tilting table 97, the top is released from between the gripping blocks 75 and permitted to fall down upon the apron 105 at the foot of the stalk. When the desired number of stalks have accumulated upon the tilting table 97, the operator releases the latch 104 from the segment 103, and swings the handle 102 backwardly to move the connecting rod 100 down and turn the table 97 into the position disclosed in dotted lines in Fig. 1, whereupon the stalks slide from the rear end of the table and are disposed in sition upon the ground.

It will of course be understood that various changes may be made in the detailed construction, arrangement of parts, and the manner of operating the same, without departing from the spirit of the invention.

Having thus described my invention, what I claim as new and desire to secure by Letters Patent of the United States is:—

1. In a cane harvester, a frame, a pair of opposed horizontal endless belts extending longitudinally in the upper portion of the frame, blocks carried upon said belts adapted to be brought together between the belts and having intermeshing horizontally corrugated faces for crimping and holding the tops of stalks, top cutting mechanism in the frame immediately beneath the rear ends of the belts, and operating means for driving said belts and actuating said mechanism whereby to carry stalks through the frame and sever the tops from the stalks prior to the release of the tops from the belts.

2. In a cane harvester, a frame, a conveyer in the upper end of the frame for engagement with the tops of stalks to hold the same in suspended position, vertically arranged and spaced apart pairs of endless chains carried in the frame, stripper bars carried across the endless chains, stripping fingers outstanding from the bars and consecutively increasing in length from the forward to the rear end of the stripper bars, means for moving the endless chains to carry the fingers downwardly at the central portion of the frame, and a topping mechanism arranged at the rear end of the frame to cut the tops from the stalks as the latter pass from the stripping fingers.

3. In a cane-harvester, a frame, a pair of horizontally disposed endless conveyers arranged longitudinally and in spaced relation within the frame, gripping blocks carried upon the endless conveyers and adapted to abut at their outer ends, the outer ends of said blocks being provided with horizontal serrated faces adapted to intermesh and crimp the tops of stalks therebetween, and means for operating the endless conveyers in unison.

In testimony whereof I have hereunto set my hand in presence of two subscribing witnesses.

CHAS. E. BELL.

Witnesses:
 CLYDE WOODS,
 G. W. THOMPSON.